US011987479B2

(12) United States Patent
Maghsoodi et al.

(10) Patent No.: US 11,987,479 B2
(45) Date of Patent: May 21, 2024

(54) CABLE TENSIONING CAPSTAN ASSEMBLY WITH INDEPENDENTLY ROTATABLE FLANGE

(71) Applicant: GOODRICH CORPORATION, Charlotte, NC (US)

(72) Inventors: Bejan Maghsoodi, San Dimas, CA (US); Steven D. Mahnken, Long Beach, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 520 days.

(21) Appl. No.: 17/221,997

(22) Filed: Apr. 5, 2021

(65) Prior Publication Data

US 2022/0315376 A1 Oct. 6, 2022

(51) Int. Cl.
*B66D 1/28* (2006.01)

(52) U.S. Cl.
CPC .................................... *B66D 1/28* (2013.01)

(58) Field of Classification Search
CPC .......... B66D 1/28; B66D 1/74; B66D 1/7442; B66D 1/7484; B66D 1/14; B66D 1/30; B66D 1/36; B66D 1/38; B66D 2700/0183; B65H 75/12–148
See application file for complete search history.

(56) References Cited

U.S. PATENT DOCUMENTS 4,372,535 A 2/1983 Gibson et al.
4,565,352 A * 1/1986 Hasselmann ............ B66D 1/30 254/344
6,607,182 B1 8/2003 Turco et al.
10,106,381 B2 * 10/2018 Lockwood ........... B66D 1/7484
10,625,995 B2 4/2020 Vaughn et al.
2013/0313495 A1 11/2013 Chenon et al.
2015/0321876 A1 * 11/2015 Galindo Gonzalez ....................... B65H 75/30 242/614

FOREIGN PATENT DOCUMENTS

DE 102005039490 A1 * 2/2007 ............... B66D 1/28
WO 2011121272 10/2011

OTHER PUBLICATIONS

European Patent Office, European Search Report dated Sep. 5, 2022 in Application No. 22164334.9.

* cited by examiner

*Primary Examiner* — Sang K Kim
*Assistant Examiner* — Nathaniel L Adams
(74) *Attorney, Agent, or Firm* — SNELL & WILMER L.L.P.

(57) ABSTRACT

A cable tensioning capstan assembly comprises a capstan drum and at least a first traction flange. The capstan drum may be configured to support a cable (e.g., a cable is configured to wrap around the capstan drum), and the capstan drum may be configured to rotate about an output axis. The first traction flange may be disposed adjacent the first axial end of the capstan drum and configured to rotate about the output axis. In various embodiments, the first traction flange is independently rotatable relative to the capstan drum. A clutch assembly between an input shaft and the first traction flange may facilitate the independent rotatability of the first traction flange.

19 Claims, 3 Drawing Sheets

CABLE TENSIONING CAPSTAN ASSEMBLY WITH INDEPENDENTLY ROTATABLE FLANGE

FIELD

The present disclosure relates to cord and/or cable management devices, systems, and methods, and more particularly to a capstan assembly having a flange that is independently rotatable.

BACKGROUND

Cables, chains, cords, fiber, ropes, and/or other types of extendible, flexible, and/or retractable lines (collectively referred to herein generally as a cable or wire-rope) can be wound onto and/or off a cable drum (also referred to herein as a drum or a take-up drum) by action of a motor and drive assembly that rotates the drum in connection with hoisting, winching, and/or other cable-reeling applications. During winding and/or unwinding, the cable can become mis-wrapped on the drum and/or otherwise fouled/strained, thereby causing equipment damage, operational delays, etc. For example, a cable can come out of alignment and risk being mis-wrapped during a winding operation due to, for example, an excessive amount of slack in a standing portion of the cable (also referred to as a payout), the cable becoming loose on the drum, a failure of a level-winding mechanism on the hoist or load, etc. In addition, a cable can also become otherwise fouled and/or strained due to, for example, binding, damage, defects, fraying, kinking, over-extending, pinching, splaying, splintering, splitting, stretching, tampering, vibrating, etc., and/or including as a result of a broken strand of a wire of the cable that can cause successive layers of wound cable to become misaligned and/or unbundled.

SUMMARY

In various embodiments, the present disclosure provides a cable tensioning capstan assembly comprising a capstan drum and a first traction flange. The capstan drum may be configured to support a cable (e.g., a cable is configured to wrap around the capstan drum). The capstan drum may be configured to rotate about an output axis. The capstan drum may also have a first axial end and a second axial end. The first traction flange may be disposed adjacent the first axial end of the capstan drum and configured to rotate about the output axis. In various embodiments, the first traction flange is independently rotatable relative to the capstan drum.

In various embodiments, the cable tensioning capstan assembly further includes an input shaft comprising a pinion configured to be rotated about an input axis. The capstan drum may include a capstan drum gear track circumferentially extending around a radially inward surface of the capstan drum that engages the pinion, wherein the pinion is configured to drive rotation of the capstan drum about the input axis. The cable tensioning capstan assembly may further include a first clutch gear configured to be rotated about the input axis, wherein the first traction flange comprises a first gear track circumferentially extending around a radially inward surface of the first traction flange that engages the first clutch gear. In various embodiments, the first clutch gear is configured to drive rotation of the first traction flange about the output axis in response to rotation of the first clutch gear in a first direction.

In various embodiments, a first gear ratio between the first clutch gear and the first traction flange is different than a capstan drum gear ratio between the pinion and the capstan drum. In various embodiments, the input shaft comprises a first shaft portion and the cable tensioning capstan assembly further comprises a first one-way roller bearing disposed between the first shaft portion and the first clutch gear. The first one-way roller bearing may be configured to transfer rotation from the first shaft portion of the input shaft to the first clutch gear in response to rotation of the input shaft in the first direction and is configured to allow free rotation of the first clutch gear relative to the first shaft portion of the input shaft in response to rotation of the input shaft in a second direction opposite the first direction.

In various embodiments, the cable tensioning capstan assembly further includes a second clutch gear configured to be rotated about the input axis, wherein the first traction flange comprises a second gear track circumferentially extending around the radially inward surface of the first traction flange that engages the second clutch gear. The second clutch gear may be configured to drive rotation of the first traction flange about the output axis in response to rotation of the second clutch gear in the second direction. In various embodiments, a second gear ratio between the second clutch gear and the first traction flange is different than the capstan drum gear ratio between the pinion and the capstan drum. In various embodiments, a second gear ratio between the second clutch gear and the first traction flange is different than the first gear ratio.

In various embodiments, the cable tensioning capstan assembly further includes a second one-way roller bearing disposed between the first shaft portion and the second clutch gear. In various embodiments, the second one-way roller bearing is configured to transfer rotation from the first shaft portion of the input shaft to the second clutch gear in response to rotation of the input shaft in the second direction and is configured to allow free rotation of the second clutch gear relative to the first shaft portion of the input shaft in response to rotation of the input shaft in the first direction.

In various embodiments, the cable tensioning capstan assembly further includes a second traction flange disposed adjacent the second axial end of the capstan drum and configured to rotate about the output axis. In various embodiments, the cable tensioning capstan assembly further comprises a third clutch gear and a fourth clutch gear configured to be rotated about the input axis. The second traction flange may comprise a third gear track circumferentially extending around a radially inward surface of the second traction flange that engages the third clutch gear and the second traction flange comprises a fourth gear track circumferentially extending around the radially inward surface of the second traction flange that engages the fourth clutch gear. The third clutch gear may be configured to drive rotation of the second traction flange about the output axis in response to rotation of the third clutch gear in the first direction and the fourth clutch gear may be configured to drive rotation of the second traction flange about the output axis in response to rotation of the fourth clutch gear in the second direction.

In various embodiments, the input shaft comprises a second shaft portion and the cable tensioning capstan assembly further includes a third one-way roller bearing disposed between the second shaft portion and the third clutch gear and a fourth one-way roller bearing disposed between the second shaft portion and the fourth clutch gear. The third one-way roller bearing may be configured to transfer rotation from the second shaft portion of the input shaft to the third clutch gear in response to rotation of the input shaft in the first direction and may be configured to allow free rotation of the third clutch gear relative to the second shaft portion of the input shaft in response to rotation of the input shaft in the second direction. The fourth one-way roller bearing may be configured to transfer rotation from the second shaft portion of the input shaft to the fourth clutch gear in response to rotation of the input shaft in the second direction and may be configured to allow free rotation of the fourth clutch gear relative to the second shaft portion of the input shaft in response to rotation of the input shaft in the first direction. In various embodiments, a third gear ratio between the third clutch gear and the second traction flange is the same as the first gear ratio and a fourth gear ratio between the fourth clutch gear and the second traction flange is the same as the second gear ratio.

Also disclosed herein, according to various embodiments, is a cable tensioning capstan assembly that includes a capstan drum, a first traction flange, a second traction flange, an input shaft, a first clutch gear, a second clutch gear, a third clutch gear, and a fourth clutch gear. The capstan drum comprises a radially outward surface around which a cable is configured to be wrapped, wherein the capstan drum is configured to rotate about an output axis and the capstan drum further comprises a first axial end, a second axial end, and a radially inward surface, according to various embodiments. The capstan drum may comprise a capstan drum gear track circumferentially extending around a radially inward surface of the capstan drum.

In various embodiments, the first traction flange is disposed adjacent the first axial end of the capstan drum and is configured to rotate about the output axis. The first traction flange may comprise a first gear track and a second gear track that circumferentially extend around a radially inward surface of the first traction flange. The second traction flange may be disposed adjacent the second axial end of the capstan drum and configured to rotate about the output axis. The second traction flange may include a third gear track and a fourth gear track that circumferentially extend around a radially inward surface of the second traction flange.

In various embodiments, the input shaft is configured to be rotated about an input axis, wherein the input shaft comprises a pinion, a first shaft portion, and a second shaft portion. The pinion engages the capstan drum gear track to drive rotation of the capstan drum about the input axis, according to various embodiments. The first clutch gear, the second clutch gear, the third clutch gear, and the fourth clutch gear may be configured to engage the respective gear tracks (i.e., the first clutch gear engages the first gear track, the second clutch gear engages the second gear track, the third clutch gear engages the third gear track, and the fourth clutch gear engages the fourth gear track).

In various embodiments, the first traction flange and the second traction flange are each independently rotatable relative to the capstan drum. In various embodiments, the first clutch gear and the third clutch gear are configured to drive rotation of the first traction flange and the second traction flange, respectively, about the output axis in response to rotation of the input shaft in a first direction, with the second clutch gear and the fourth clutch gear configured to freely rotate relative to the input shaft in response to the input shaft rotating in the first direction. In various embodiments, the second clutch gear and the fourth clutch gear are configured to drive rotation of the first traction flange and the fourth traction flange, respectively, about the output axis in response to rotation of the input shaft in a second direction, with the first clutch gear and the third clutch gear configured to freely rotate relative to the input shaft in response to the input shaft rotating in the second direction.

In various embodiments, the cable tensioning capstan assembly further includes a first one-way roller bearing, a second one-way roller bearing, a third one-way roller bearing, and a fourth one-way roller bearing disposed between the input shaft and the first clutch gear, the second clutch gear, the third clutch gear, and the fourth clutch gear, respectively. In various embodiments, a first gear ratio between the first clutch gear and the first traction flange is lower than a capstan drum gear ratio between the pinion and the capstan drum, a second gear ratio between the second clutch gear and the first traction flange is higher than the capstan drum gear ratio, a third gear ratio between the third clutch gear and the second traction flange is the same as the first gear ratio, and a fourth gear ration between the fourth clutch gear and the second traction flange is the same as the second gear ratio.

Also disclosed herein, according to various embodiments, is a cable tensioning capstan assembly that includes a capstan drum around which a cable is configured to be wrapped, wherein the capstan drum is configured to rotate about an output axis and wherein the capstan drum comprises a first axial end and a second axial end. The cable tensioning capstan assembly may also include a first traction flange disposed adjacent the first axial end of the capstan drum and configured to rotate about the output axis and an input shaft comprising a pinion and a first shaft portion. The pinion may engage the capstan drum and the first shaft portion may support a first friction clutch assembly that is coupled to the first traction flange. The first traction flange may be independently rotatable relative to the capstan drum. In various embodiments, the cable tensioning capstan assembly further includes a second traction flange disposed adjacent the second axial end of the capstan drum and configured to rotate about the output axis. In various embodiments, the input shaft comprises a second shaft portion and wherein the second shaft portion supports a second friction clutch assembly that is coupled to the second traction flange.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
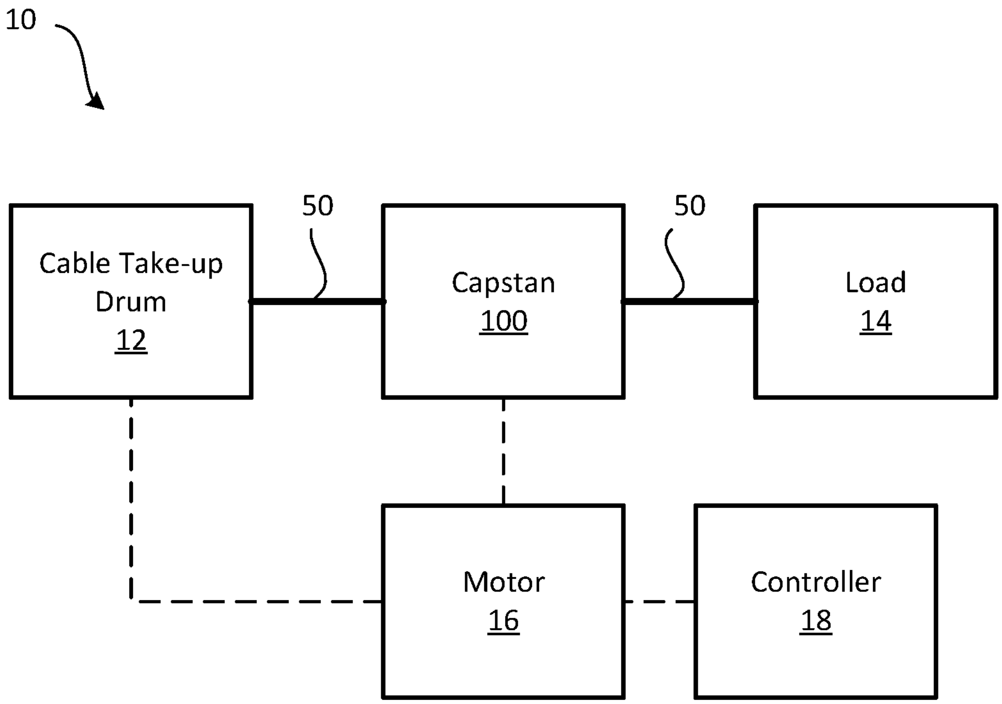
FIG. 1 is a schematic block diagram of a cable winding system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments and with reference to FIG. 1, is cable system 10. The cable system 10, which may also be referred to herein as a cable winding system, a hoist system, and/or a winch system, generally includes components for managing a cable 50 (e.g., chain, cord, fiber, rope, and/or other types of extendible, flexible, and/or retractable line). The cable system 10 may include a cable take-up drum 12 and a cable tensioning capstan assembly 100. In various embodiments, and as described in greater detail below with reference to FIGS. 2A and 2B, the cable tensioning capstan assembly 100 is configured to address at least some of the aforementioned shortcomings and/or challenges of conventional cable systems. For example, the system 10 and the disclosed cable tensioning capstan assembly 100 may reduce the potential of the cable 50 becoming mis-wrapped on the drum and/or may otherwise prevent or at least reduce the likelihood of the cable 50 becoming fouled, tangled, overly strained, and/or damaged.

The cable system 10 may be utilized for retracting and/or cable-reeling applications, and a load 14 may be attached at one of the cable 50. In various embodiments, also as described in greater detail below, the cable system 10 may include a motor 16 (e.g., may be a motor-driven system) and/or a controller 18. The motor 16 and/or controller 18 may be coupled in electric control communication with one or both of the cable take-up drum 12 and the cable tensioning capstan assembly 100. For example, the cable 50 may be wound onto and/or off the take-up drum 12 by action of the motor 16. The system 10 may also include a drive train or drive assembly that drives rotation of the drum(s) in connection with hoisting, winching, and/or other cable-reeling applications.

Referring generally, the system 10 may be a hoist system configured to mechanically lift and/or lower loads 14 oftentimes by a motor-driven drum or lift-wheel around which a cable 50 winds and/or unwinds, in various embodiments. In various embodiments, hoists are operated electrically, hydraulically, manually, and/or pneumatically. Still referring generally, hoists apply a pulling force to the load 14 through the cable 50 in order to control and/or move the load 14 from one physical location to another physical location. In various embodiments, hoist assemblies have a lifting harness, hook, hoop, loop and/or other suitable attachment end (collectively referred to herein generally as a hook) at a distal end of the cable 50, which can be affixed and/or secured to the load 14. In various embodiments, the cable take-up drum 12 at the cable end is the fixed end, and the hook end of the cable 50 is the opposing free end. In various embodiments, the load 14 is referred to as cargo, a payload, target, etc. In various embodiments, hoists couple the cable 50 to the load 14 using the hook. In various embodiments, an effective radius of the take-up drum 12 or lift wheel increases as the cable 50 is pulled in, and it decreases as the cable 50 is let out, due to the physically changing, radially successive layers of cable 50 laid thereon.

The cable system 10 may be utilized in many environments, such as air rescues, automobile/car/truck applications, anchor systems, cable cars, cranes, elevators, escalators, mine operations, moving sidewalks, rope tows, ski lifts, tethers, etc. In various embodiments, the cable system 10 may be mounted or otherwise implemented with an aircraft, such as a helicopter. Referring generally, a rescue hoist can be used to pull a target towards and/or into a rescue aircraft, such as a rescue helicopter, including by initially lowering a basket, cage, or other device to the target, securing the target, and then pulling back and/or retrieving the target back to the rescue aircraft, in various embodiments.

Figure 2A:
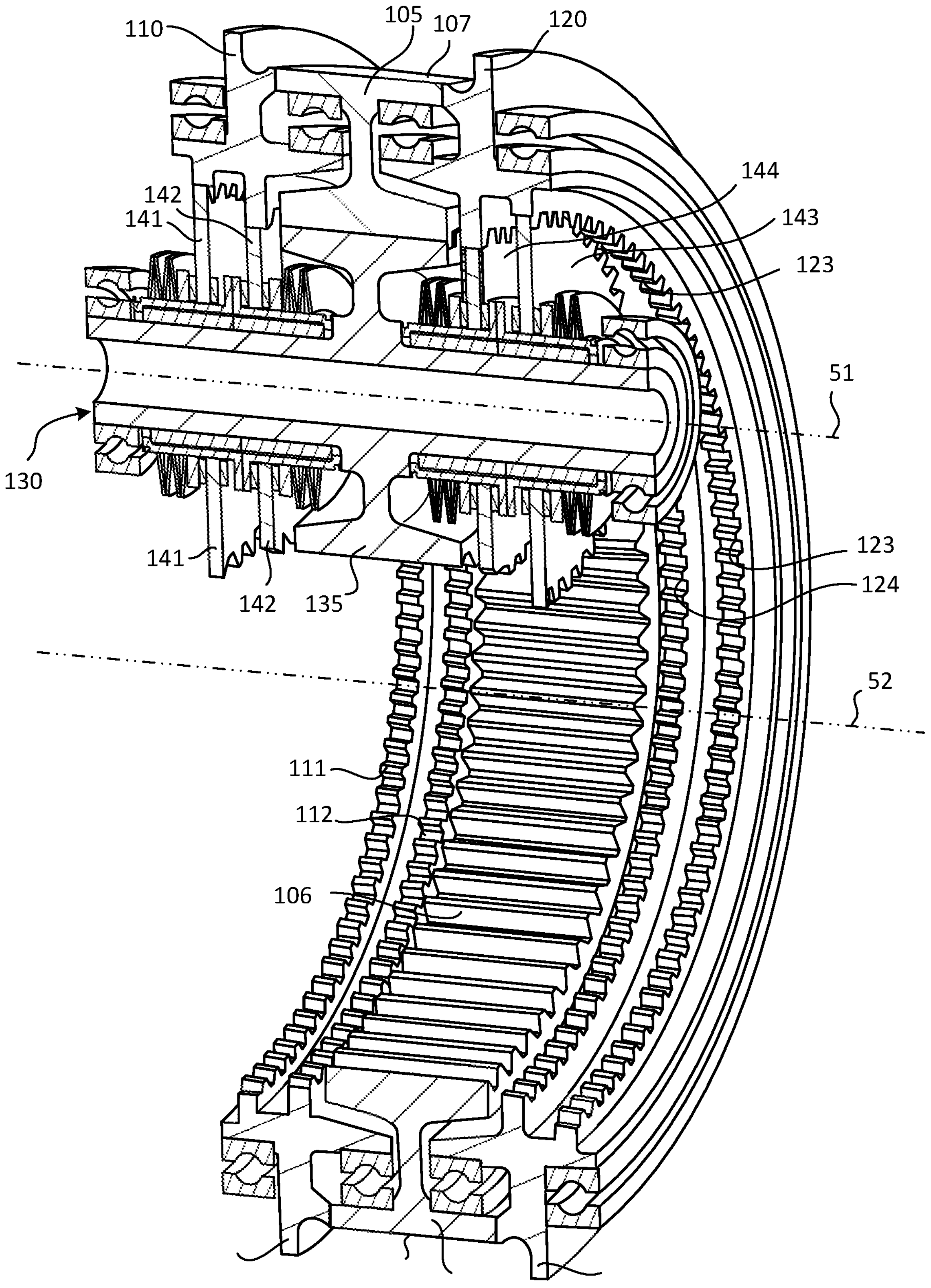
FIGS. 2A and 2B are cross-sectional views of cable tensioning capstan assembly of a cable winding system, in accordance with various embodiments.
Figure 2B:
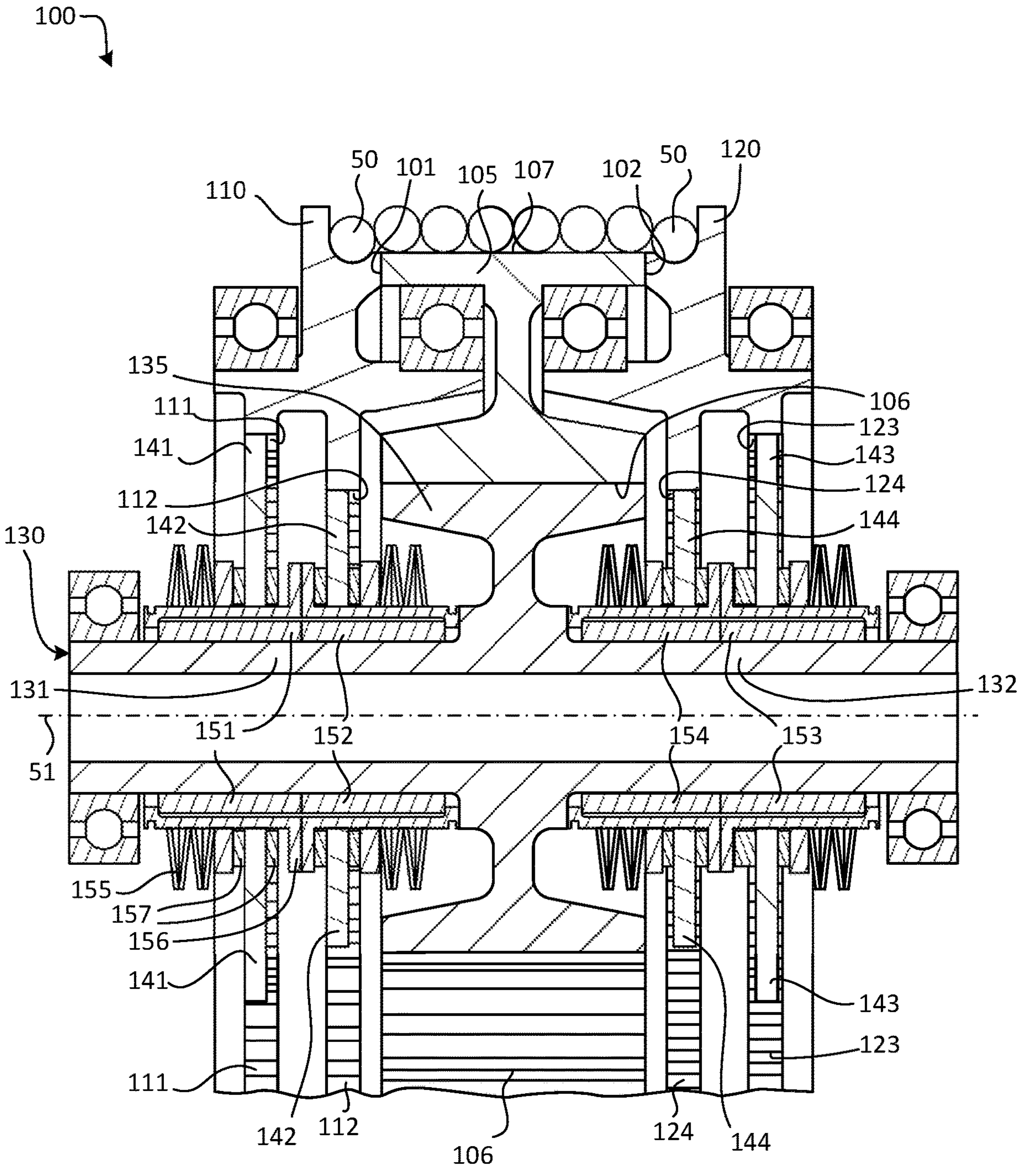

In various embodiments, and with reference to FIGS. 2A and 2B, the cable tensioning capstan assembly 100 is shown in additional details. The term "cable tensioning capstan assembly" as used herein generally refers to a rotating device that facilitates cable wrapping and/or reeling. The disclosed cable tensioning capstan assembly 100 is not limited to devices having a vertical axis of rotation, but instead may be used for devices having a horizontal axis of rotation (e.g., a windlass). In various embodiments, the cable tensioning capstan assembly 100 is implemented as an intermediate component between a load 14 and a take-up drum 12 that holds the wound cable 50. However, in various embodiments, and depending the length of the cable 50 and other conditions, the cable tensioning capstan assembly 100 may be implemented without a separate take-up drum.

In various embodiments, the cable tensioning capstan assembly 100 includes a capstan drum 105 and at least a first traction flange 110. The cable tensioning capstan assembly 100 may also have a second traction flange 120. The capstan drum 105 may be configured to hold one or multiple wraps of cable 50 (e.g., see FIG. 2B), and the capstan drum 105 may be configured to rotate about an output axis 52. Said differently, the capstan drum 105 may have a radially outward surface 107 around which a cable 50 is configured to be wrapped. The first traction flange 110, according to various embodiments, is disposed adjacent one of the axial ends of the capstan drum 105, and is also configured to rotate about the output axis 52. Generally, the one or more traction flanges 110, 120 are independently rotatable relative to the capstan drum 105 (and independently rotatable relative to one another). Said differently, the one or more traction flanges 110, 120 are not unitary extensions of the capstan drum, as may be the case with various conventional cable capstans, but instead are separate and distinct components. Accordingly, as shown in the figures, one or more bearings may be disposed between respective facing surfaces of the capstan drum 105 and the traction flanges 110, 120 to facilitate and/or enable the ability of the traction flanges 110, 120 to be independently rotated.

As explained in more detail below, with one or both of the traction flanges 110, 120 that define the cable-wrap volume being independently rotatable, the first/last wrap of cable 50 that is wrapped around the axially extending portion of these traction flanges 110, 120 may be differentially tensioned, relative to the wraps of cable 50 around the capstan drum 105. Said differently, the traction flanges 110, 120 may be driven by differential gear-driven clutches that can be independently set for a prescribed torque, thus enabling the first/last wrap (i.e., the edge wraps) of the cable 50 that is around the traction flanges 110, 120 to have a specific tension. For example, the traction flange(s) 110, 120 may advance or retard the torque transfer to the cable 50 relative to the cable 50 wrapped around the capstan drum 105, and this relative advancement or retardation (dependent upon the direction of rotation) of the portion of the cable 50 that is engaged against/wrapped around the axially extending sections of the traction flanges 110, 120 may facilitate clean wrapping or unreeling of the cable 50, may prevent cable slip, and/or may otherwise improve the operational efficiency and effectiveness of a winding/reeling procedure.

As used herein, the term "independently rotatable" when referred to the traction flanges 110, 120 relative to the capstan drum 105 does not necessarily mean that said components are actually rotating separately at different speeds during operation, but instead is meant to convey the concept that the traction flanges 110, 120 and the capstan drum 105 are separate components that are separately coupled to an input shaft 130. That is, the cable tensioning capstan assembly 100 may include an input shaft 130, which may be a final stage of gear train or a gear assembly for conveying rotational power from a motor. Generally, the input shaft 130 may be configured to directly drive (via direct engagement or via one or more intermediate idler gears) rotation of the capstan drum 105, while the input shaft 130 may be coupled to the one or more traction flanges 110, 120 via one or more clutch assemblies (e.g., a friction clutch assembly) to selectively drive and/or selectively provide torque transfer to the one or more traction flanges 110, 120.

As used herein, the terms "radial" and "axial" and similar phrasing are defined relative to the axes of rotation of the cable tensioning capstan assembly 100. That is, and with reference to FIG. 2A, the cable tensioning capstan assembly 100 generally includes an input axis 51 and an output axis 52. The input shaft 130, which includes pinion 135 and multiple clutch gears 141, 142, 143, 144 as described below, rotate around the input axis 51 while the capstan drum 105, the first traction flange 110, and the second traction flange 120 generally rotate about the output axis 52. Thus, a first component (e.g., surface or feature, etc.) that is "radially outward" of a second component is closer to the associated axis of rotation than the second component. Similarly, an axially extending feature is a feature that generally extends parallel to one/both of the axes of rotation and a radially extending feature is one that generally extends in a direction radially away from or towards the pertinent axis of rotation. Further, a component that is axially outward of another component is further away from a longitudinal center point.

In various embodiments, and with continued reference to FIGS. 2A and 2B, the input shaft 130 comprises a pinion 135. A radially inward surface of the capstan drum 105 may have a capstan drum gear track 106 that circumferentially extends around the radially inward surface of the capstan drum 105. This capstan drum gear track 106 engages the pinion 135 such that the pinion 135 is configured to drive rotation of the capstan drum 105 about the input axis 51, according to various embodiments.

In various embodiments, the cable tensioning capstan assembly 100 further includes a first clutch gear 141 configured to be rotated about the input axis 51. The first traction flange 110 may include a first gear track 111 circumferentially extending around a radially inward surface of the first traction flange 110. This first gear track 111 engages the first clutch gear 141 and the first clutch gear 141 is configured to drive rotation of the first traction flange 110 about the output axis 52 in response to rotation of the first clutch gear 141 in a first direction. Said differently, the input shaft 130 may have a first shaft portion 131, and the cable tensioning capstan assembly 100 may include a first one-way roller bearing 151 disposed radially between the first shaft portion 131 and the first clutch gear 141. The first one-way roller bearing 151 may be configured to transfer rotation from the first shaft portion 131 of the input shaft 130 to the first clutch gear 141 in response to rotation of the input shaft 130 in a first direction while allowing free rotation of the first clutch gear 141 relative to the input shaft 130 in response to rotation of the input shaft 130 in a second direction opposite the first direction.

Correspondingly, the cable tensioning capstan assembly 100 may further include a second clutch gear 142 configured to be rotated about the input axis 51, with the first traction flange 110 also comprising a second gear track 112 circumferentially extending around the radially inward surface of the first traction flange 110 that engages the second clutch gear 142. This second gear track 112 engages the second clutch gear 142 and the second clutch gear 142 is configured to drive rotation of the first traction flange 110 about the output axis 52 in response to rotation of the second clutch gear 142 in a second direction. Said differently, the cable tensioning capstan assembly 100 may further include a second one-way roller bearing 152 disposed radially between the first shaft portion 131 and the second clutch gear 142. The second one-way roller bearing 152 may be configured to transfer rotation from the first shaft portion 131 of the input shaft 130 to the second clutch gear 142 in response to rotation of the input shaft 130 in the second direction while allowing free rotation of the second clutch gear 142 relative to the input shaft 130 in response to rotation of the input shaft 130 in the first direction.

The directional specific configuration of the first and second one-way roller bearings 151, 152 enable a first desired torque/tension to be transferred to the edge cable 50 that is wrapped around the first traction flange 110 when the input shaft 130 is rotating in a first direction (via the first clutch gear 141) while allowing/enabling a different, second desired torque/tension to be transferred to the edge cable 50 when input shaft 130 is rotating in a second direction (via the second clutch gear 142). This differential tensioning of the edge cable 50 based on the direction of rotation of the input shaft 130 is accomplished by sizing the first clutch gear 141 and the second clutch gear 142 differently. That is, the radii of the respective clutch gears 141, 142, and thus the corresponding number of teeth, are different, thus enabling different gear ratios based on the direction of rotation of the input shaft 130. For example, a first gear ratio between the first clutch gear 141 and the first traction flange 110 is different than a second gear ratio between the second clutch gear 142 and the first traction flange 110, according to various embodiments. In various embodiments, the first and second gear ratio are different than a capstan drum gear ratio between the pinion 135 and the capstan drum 105. For example, the first gear ratio may be smaller than the capstan drum gear ratio, and the capstan drum gear ratio may be smaller than the second gear ratio. Said differently, the radius of the first clutch gear 141, as measured relative to the input axis 51, may be larger than the radius of the pinion 135, and the radius of the pinion 135 may be larger than the radius of the second clutch gear 142.

In various embodiments, the cable tensioning capstan assembly 100 may have a corresponding structure for the second traction flange 120. That is, the first traction flange 110 described above may be disposed adjacent a first axial end 101 of the capstan drum 105, and the cable tensioning capstan assembly 100 may further include a second traction flange 120 disposed adjacent a second axial end 102 of the capstan drum 105. In various embodiments, cable tensioning capstan assembly 100 further comprises a third clutch gear 143 and a fourth clutch gear 144 configured to be rotated about the input axis 51. Correspondingly, the second traction flange 120 comprises a third gear track 123 circumferentially extending around a radially inward surface of the second traction flange 120 that engages the third clutch gear 143 and the second traction flange 120 also has a fourth gear track 124 circumferentially extending around the radially inward surface of the second traction flange 120 that engages the fourth clutch gear 144. The third clutch gear 143 may be configured to drive rotation of the second traction flange 120 about the output axis 52 in response to rotation of the input shaft 130 and third clutch gear 143 in the first direction while the fourth clutch gear 144 is configured to drive rotation of the second traction flange 120 about the output axis 52 in response to rotation of the input shaft 130 and the fourth clutch gear 144 in the second direction.

Similar to the arrangement of the first traction flange 110, the input shaft 130 may comprise a second shaft portion 132, and the cable tensioning capstan assembly 100 may further include a third one-way roller bearing 153 disposed radially between the second shaft portion 132 and the third clutch gear 143 and a fourth one-way roller bearing 154 disposed between the second shaft portion 132 and the fourth clutch gear 144. The third one-way roller bearing 153 is configured to transfer rotation from the second shaft portion 132 of the input shaft 130 to the third clutch gear 143 in response to rotation of the input shaft 130 in the first direction while allowing free rotation of the third clutch gear 143 relative to the second shaft portion 132 of the input shaft 130 in response to rotation of the input shaft 130 in the second direction, according to various embodiments. The fourth one-way roller bearing 154 is configured to transfer rotation from the second shaft portion 132 of the input shaft 130 to the fourth clutch gear 144 in response to rotation of the input shaft 130 in the second direction and is configured to allow free rotation of the fourth clutch gear 144 relative to the second shaft portion 132 of the input shaft 130 in response to rotation of the input shaft 130 in the first direction. In various embodiments, the third clutch gear 143 may be comparable/similar to the first clutch gear 141 and the second clutch gear 142 may be comparable/similar to the fourth clutch gear 144. In other words, a third gear ratio between the third clutch gear 143 and the second traction flange 120 may be the same as the first gear ratio while a fourth gear ratio between the fourth clutch gear 144 and the second traction flange 120 may be the same as the second gear ratio.

In various embodiments, another benefit contemplated and provided by the disclosed cable tensioning capstan assembly 100 is preventing cable slippage at the interface of the cable 50 with the capstan drum 105. That is, the cable tensioning capstan assembly 100 may generally include a clutch assembly configured to control the tension of the cable while the cable is being wrapped or let-out from the take-up drum. The clutch assembly, as described in greater detail below, may be an adjustable clutch that limits the available torque that can be transferred to underdrive or overdrive one of the capstan flanges. In various embodiments, and with reference to FIG. 2B, the cable tensioning capstan assembly 100 includes a friction clutch assembly generally coupled between the directional, one-way roller bearings 151, 152, 153, 154 and the respective clutch gears 141, 142, 143, 144. For example, the clutch gears 141, 142, 143, 144 may be respectively retained/secured to the roller bearings 151, 152, 153, 154 via friction disks 157. In various embodiments, a shoulder bracket 156 or other component may be mounted between the one-way roller bearings 151, 152, 153, 154 and the clutch gears 141, 142, 143, 144, and an axial spring assembly may be disposed radially outward of the shoulder bracket 156. Said differently, torque may be transferred to the clutch gears 141, 142, 143, 144 from the input shaft 130 via a clamping force exerted on opposing axial sides of each of the clutch gears 141, 142, 143, 144 by friction disks 157. The clamping force may be provided by one or more springs 155 that exert an axial force on one or more friction disks 157 to retain the clutch gears 141, 142, 143, 144 co-rotating with the input shaft 130 until a predetermined torque is achieved (e.g., until a desired tension is transferred to the edge cable wrap), at which point clutch gears 141, 142, 143, 144 slip. Such a configuration may prevent excessive tension being transferred to the cable 50. Further, by using a friction engagement between the clutch gears 141, 142, 143, 144 and the input shaft 130, the threshold at which the clutch gears 141, 142, 143, 144 slip may be tailored to be below the slippage threshold of the cable 50 around the capstan drum 105, thus preventing cable slippage, which could damage the cable 50. That is, instead of allowing the cable 50 to slip, the slippage is moved to the friction disks 157 of the clutch gears 141, 142, 143, 144. Depending on the use situation and/or the cable properties, the friction disks 157 (e.g., the axial tension properties of the spring 155) may be customized to limit torque transfer to the cable. In various embodiments, the traction flange(s) are not configured to slip relative to the capstan drum, but instead the traction flanges are configured to apply torque to the first/last layer of cable wrapped around the capstan drum, pulling it off/on the capstan and/or creating tension.

In various embodiments, as mentioned above the traction flanges 110, 120 generally have a radially extending section that forms sidewall(s) of a wrapped cable volume. In various embodiments, the traction flanges 110, 120 also include an axially extending section having a radially outward surface that is generally aligned (radially) with radially outward surface 107 of the capstan drum 105. In various embodiments, the axially extending section of the traction flanges 110, 120 is sized for a specific cable. That is, the axial span of the axially extending section of the traction flanges 110, 120 may be comparable to the diameter of the cable 50, thus allowing for a single wrap of cable to be wrapped around the axially extending section of the flanges. In various embodiments, this radially outward surface of the axially extending section of the flanges 110, 120 is rounded/curved to receive the edge cable wrap.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cable tensioning capstan assembly comprising:
- a capstan drum around which a cable is configured to be wrapped, wherein the capstan drum is configured to rotate about an output axis and wherein the capstan drum comprises a first axial end and a second axial end; and
- a first traction flange disposed adjacent the first axial end of the capstan drum and configured to rotate about the output axis, wherein the first traction flange comprises a first gear track and a second gear track that circumferentially extend around a radially inward surface of the first traction flange;
- wherein the first traction flange is independently rotatable relative to the capstan drum.

2. The cable tensioning capstan assembly of claim 1, further comprising an input shaft comprising a pinion configured to be rotated about an input axis, wherein the capstan drum comprises a capstan drum gear track circumferentially extending around a radially inward surface of the capstan drum that engages the pinion, wherein the pinion is configured to drive rotation of the capstan drum about the output axis.

3. The cable tensioning capstan assembly of claim 2, further comprising a first clutch gear configured to be rotated about the input axis, wherein the first gear track engages the first clutch gear, wherein the first clutch gear is configured to drive rotation of the first traction flange about the output axis in response to rotation of the first clutch gear in a first direction.

4. The cable tensioning capstan assembly of claim 3, wherein a first gear ratio between the first clutch gear and the first traction flange is different than a capstan drum gear ratio between the pinion and the capstan drum.

5. The cable tensioning capstan assembly of claim 4, wherein the input shaft comprises a first shaft portion, wherein the cable tensioning capstan assembly further comprises a first one-way roller bearing disposed between the first shaft portion and the first clutch gear.

6. The cable tensioning capstan assembly of claim 5, wherein the first one-way roller bearing is configured to transfer rotation from the first shaft portion of the input shaft to the first clutch gear in response to rotation of the input shaft in the first direction and is configured to allow free rotation of the first clutch gear relative to the first shaft portion of the input shaft in response to rotation of the input shaft in a second direction opposite the first direction.

7. The cable tensioning capstan assembly of claim 6, further comprising a second clutch gear configured to be rotated about the input axis, wherein the first traction flange comprises a second gear track circumferentially extending around the radially inward surface of the first traction flange that engages the second clutch gear, wherein the second clutch gear is configured to drive rotation of the first traction flange about the output axis in response to rotation of the second clutch gear in the second direction.

8. The cable tensioning capstan assembly of claim 7, wherein a second gear ratio between the second clutch gear and the first traction flange is different than the capstan drum gear ratio between the pinion and the capstan drum.

9. The cable tensioning capstan assembly of claim 7, wherein a second gear ratio between the second clutch gear and the first traction flange is different than the first gear ratio.

10. The cable tensioning capstan assembly of claim 8, wherein the cable tensioning capstan assembly further comprises a second one-way roller bearing disposed between the first shaft portion and the second clutch gear.

11. The cable tensioning capstan assembly of claim 10, wherein the second one-way roller bearing is configured to transfer rotation from the first shaft portion of the input shaft to the second clutch gear in response to rotation of the input shaft in the second direction and is configured to allow free rotation of the second clutch gear relative to the first shaft portion of the input shaft in response to rotation of the input shaft in the first direction.

12. The cable tensioning capstan assembly of claim 11, further comprising a second traction flange disposed adjacent the second axial end of the capstan drum and configured to rotate about the output axis.

13. The cable tensioning capstan assembly of claim 12, wherein:

the cable tensioning capstan assembly further comprises a third clutch gear and a fourth clutch gear configured to be rotated about the input axis;

the second traction flange comprises a third gear track circumferentially extending around a radially inward surface of the second traction flange that engages the third clutch gear and the second traction flange comprises a fourth gear track circumferentially extending around the radially inward surface of the second traction flange that engages the fourth clutch gear; and the third clutch gear is configured to drive rotation of the second traction flange about the output axis in response to rotation of the third clutch gear in the first direction and the fourth clutch gear is configured to drive rotation of the second traction flange about the output axis in response to rotation of the fourth clutch gear in the second direction.

14. The cable tensioning capstan assembly of claim 13, wherein:

the input shaft comprises a second shaft portion;

the cable tensioning capstan assembly further comprises a third one-way roller bearing disposed between the second shaft portion and the third clutch gear and a fourth one-way roller bearing disposed between the second shaft portion and the fourth clutch gear;

the third one-way roller bearing is configured to transfer rotation from the second shaft portion of the input shaft to the third clutch gear in response to rotation of the input shaft in the first direction and is configured to allow free rotation of the third clutch gear relative to the second shaft portion of the input shaft in response to rotation of the input shaft in the second direction; and the fourth one-way roller bearing is configured to transfer rotation from the second shaft portion of the input shaft to the fourth clutch gear in response to rotation of the input shaft in the second direction and is configured to allow free rotation of the fourth clutch gear relative to the second shaft portion of the input shaft in response to rotation of the input shaft in the first direction.

15. The cable tensioning capstan assembly of claim 14, wherein a third gear ratio between the third clutch gear and the second traction flange is the same as the first gear ratio and a fourth gear ratio between the fourth clutch gear and the second traction flange is the same as the second gear ratio.

16. A cable tensioning capstan assembly comprising:

a capstan drum around which a cable is configured to be wrapped, wherein the capstan drum is configured to rotate about an output axis and wherein the capstan drum comprises a first axial end and a second axial end;

a first traction flange disposed adjacent the first axial end of the capstan drum and configured to rotate about the output axis;

an input shaft comprising a pinion and a first shaft portion, wherein the pinion engages the capstan drum and wherein the first shaft portion supports a first friction clutch assembly that is coupled to the first traction flange;

a second traction flange disposed adjacent the second axial end of the capstan drum and configured to rotate about the output axis, wherein the input shaft comprises a second shaft portion and wherein the second shaft portion supports a second friction clutch assembly that is coupled to the second traction flange; and wherein the first traction flange is independently rotatable relative to the capstan drum.

17. A cable tensioning capstan assembly comprising a capstan drum comprising a radially outward surface around which a cable is configured to be wrapped, wherein the capstan drum is configured to rotate about an output axis and wherein the capstan drum further comprises a first axial end, a second axial end, and a radially inward surface, wherein the capstan drum comprises a capstan drum gear track circumferentially extending around the radially inward surface of the capstan drum;

a first traction flange disposed adjacent the first axial end of the capstan drum and configured to rotate about the output axis, wherein the first traction flange comprises a first gear track and a second gear track that circumferentially extend around a radially inward surface of the first traction flange;

a second traction flange disposed adjacent the second axial end of the capstan drum and configured to rotate about the output axis, wherein the second traction flange comprises a third gear track and a fourth gear track that circumferentially extend around a radially inward surface of the second traction flange;

an input shaft configured to be rotated about an input axis, wherein the input shaft comprises a pinion, a first shaft portion, and a second shaft portion, wherein the pinion engages the capstan drum gear track to drive rotation of the capstan drum about the input-output axis; and a first clutch gear, a second clutch gear, a third clutch gear, and a fourth clutch gear, wherein the first clutch gear engages the first gear track, the second clutch gear engages the second gear track, the third clutch gear engages the third gear track, and the fourth clutch gear engages the fourth gear track;

wherein the first traction flange and the second traction flange are each independently rotatable relative to the capstan drum;

wherein the first clutch gear and the third clutch gear are configured to drive rotation of the first traction flange and the second traction flange, respectively, about the output axis in response to rotation of the input shaft in a first direction, with the second clutch gear and the fourth clutch gear configured to freely rotate relative to the input shaft in response to the input shaft rotating in the first direction;

wherein the second clutch gear and the fourth clutch gear are configured to drive rotation of the first traction flange and the fourth traction flange, respectively, about the output axis in response to rotation of the input shaft in a second direction, with the first clutch gear and the third clutch gear configured to freely rotate relative to the input shaft in response to the input shaft rotating in the second direction.

18. The cable tensioning capstan assembly of claim 17, wherein the cable tensioning capstan assembly further comprises a first one-way roller bearing, a second one-way roller bearing, a third one-way roller bearing, and a fourth one-way roller bearing disposed between the input shaft and the first clutch gear, the second clutch gear, the third clutch gear, and the fourth clutch gear, respectively.

19. The cable tensioning capstan assembly of claim 17, wherein:

a first gear ratio between the first clutch gear and the first traction flange is lower than a capstan drum gear ratio between the pinion and the capstan drum;

a second gear ratio between the second clutch gear and the first traction flange is higher than the capstan drum gear ratio;

a third gear ratio between the third clutch gear and the second traction flange is the same as the first gear ratio; and a fourth gear ration between the fourth clutch gear and the second traction flange is the same as the second gear ratio.

* * * * *